(12) United States Patent
Everly et al.

(10) Patent No.: US 11,585,252 B2
(45) Date of Patent: Feb. 21, 2023

(54) HIGH POWER DENSITY INSULATED EXHAUST HEATING SYSTEM

(71) Applicant: WATLOW ELECTRIC MANUFACTURING COMPANY, St. Louis, MO (US)

(72) Inventors: Mark D. Everly, St. Charles, MO (US); Jeremy Ohse, St. Louis, MO (US); David P. Culbertson, Bristol, WI (US); Richard T. Williams, Genoa City, WI (US); George Jambor, Burlington, WI (US); Jacob Wilson, St. Charles, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 0 days.

(21) Appl. No.: 17/535,096

(22) Filed: Nov. 24, 2021

(65) Prior Publication Data
US 2022/0082043 A1 Mar. 17, 2022

Related U.S. Application Data

(63) Continuation of application No. 17/411,352, filed on Aug. 25, 2021, now Pat. No. 11,408,314, which is a
(Continued)

(51) Int. Cl.
*F01N 3/20* (2006.01)
*F01N 3/027* (2006.01)
(Continued)

(52) U.S. Cl.
CPC .......... *F01N 3/2013* (2013.01); *F01N 3/027* (2013.01); *F23G 7/00* (2013.01); *H05B 3/48* (2013.01);
(Continued)

(58) Field of Classification Search
CPC .... F01N 3/027; F01N 3/2013; F01N 2240/16; F01N 2450/22; F23G 7/00; H05B 3/48; H05B 2203/014; H05B 2203/022
See application file for complete search history.

(56) References Cited

U.S. PATENT DOCUMENTS 4,948,774 A   8/1990 Usui et al.
5,255,511 A * 10/1993 Maus ................ F01N 11/002
                                                502/527.22
(Continued)

FOREIGN PATENT DOCUMENTS

CN          1373830 A     10/2002
CN        101820994 A      9/2010
(Continued)

*Primary Examiner* — Audrey B. Walter
(74) *Attorney, Agent, or Firm* — Burris Law, PLLC (57) ABSTRACT

A heating apparatus for a fluid flow system having a container body includes a heater element and a strip. The heater element is within the container body and includes an electrical resistance element, a sheath, and an insulating material. The sheath extends along a predefined path through the container body and surrounds the electrical resistance element along the predefined path. The insulating material is disposed about the electrical resistance element between the electrical resistance element and the sheath. The insulating material electrically insulates the electrical resistance element from the sheath. The strip is disposed inside the container body and defines a tortuous geometry that follows the predefined path. The strip defines a plurality of openings at discrete locations along the strip. The heater element extends through the plurality of openings and is configured to contact the strip at the discrete locations.

20 Claims, 8 Drawing Sheets

Related U.S. Application Data continuation of application No. 16/806,175, filed on Mar. 2, 2020, now Pat. No. 11,131,227, which is a continuation of application No. 15/448,200, filed on Mar. 2, 2017, now Pat. No. 10,598,064.

(60) Provisional application No. 62/415,042, filed on Oct. 31, 2016.

(51) Int. Cl.
*F23G 7/00* (2006.01)
*H05B 3/48* (2006.01)

(52) U.S. Cl.
CPC ...... *F01N 2240/16* (2013.01); *F01N 2450/22* (2013.01); *H05B 2203/014* (2013.01); *H05B 2203/022* (2013.01)

(56) References Cited

U.S. PATENT DOCUMENTS

| | | |
|---|---|---|
| 5,474,746 A | 12/1995 | Maus et al. |
| 5,529,759 A | 6/1996 | Sanada et al. |
| 5,672,324 A | 9/1997 | Okamoto et al. |
| 2012/0097659 A1 | 4/2012 | Deusterdiek et al. |

FOREIGN PATENT DOCUMENTS

| | | |
|---|---|---|
| CN | 102414409 A | 4/2012 |
| DE | 19943846 A1 | 3/2001 |
| JP | H06506153 | 7/1994 |
| JP | H07500052 | 1/1995 |
| JP | H08103664 | 4/1996 |
| JP | H08131848 | 5/1996 |
| JP | H08193509 | 7/1996 |
| JP | H08218846 | 8/1996 |
| JP | 2003509620 | 3/2003 |

\* cited by examiner

HIGH POWER DENSITY INSULATED EXHAUST HEATING SYSTEM

CROSS-REFERENCE TO RELATED APPLICATIONS

The present application is a continuation of U.S. patent application Ser. No. 17/411,352, filed on Aug. 25, 2021, which is a continuation of U.S. patent application Ser. No. 16/806,175, filed on Mar. 2, 2020, which is a continuation of U.S. patent application Ser. No. 15/448,200, filed on Mar. 2, 2017, which claims the benefit of U.S. Provisional Application No. 62/415,042, filed Oct. 31, 2016, entitled "High Power Density Insulated Exhaust Heating System." The disclosures of the above applications are incorporated herein by reference in their entireties.

FIELD

The present disclosure relates to exhaust systems for internal combustion engines, and more specifically to exhaust gas heating apparatuses installed in the exhaust systems.

BACKGROUND

The statements in this section merely provide background information related to the present disclosure and may not constitute prior art.

Heater systems are used in exhaust systems that are coupled to an internal combustion engine in order to assist in the reduction of the undesirable release of various gases and other pollutant emissions into the atmosphere. These exhaust systems typically include various after-treatment devices, such as diesel particulate filters (DPF); a catalytic converter; selective catalytic reducers (SCR) that capture carbon monoxide (CO), nitrogen oxides ($NO_x$), particulate matters (PMs), and unburned hydrocarbons (HCs) contained in the exhaust gas; a diesel oxidation catalyst (DOC); a lean $NO_x$ trap (LNT); an ammonia slip catalyst; or reformers, among others. The heaters may be activated periodically or at a predetermined time to increase the exhaust temperature and activate the catalysts and/or to burn the particulate matters or unburned hydrocarbons that have been captured in the exhaust system.

The electric heaters are generally installed in exhaust pipes or components such as containers of the exhaust system and are subjected to harsh environmental conditions, such as vibration, mechanical shock, temperature cycling, high heat, etc.

SUMMARY

In one form, a heating apparatus for an exhaust gas system having a container body is provided. The heating apparatus includes at least one heater element, and a support member disposed inside the container body for restricting movement of the at least one heating element in the container body. The support member defines a tortuous geometry and flanks opposed sides of the at least one heater element and thus is arranged to increase heat transfer from the at least one heater element to an exhaust gas flowing through the container body.

In another form, a heating apparatus for an exhaust gas system is provided. The heating apparatus includes an outer peripheral wall defining a tubular shape and having a hollow space, at least one heater element disposed in the hollow space, and a plurality of fins attached to the at least one heater element to transfer heat from the at least one heater element to an exhaust gas that flows through the hollow space of the outer peripheral wall.

In still another form, a heating apparatus for an exhaust gas system is provided. The heating apparatus includes an outer peripheral wall having a tubular shape and defining a hollow space, a heater element disposed in the hollow space, and a strip member. The heater element includes a plurality of sections arranged along a radial direction of the outer peripheral wall. The strip member includes a plurality of sections disposed between adjacent two of the sections of the heater element and between an outermost section of the heater element and the outer peripheral wall. The strip member secures the heater element to the outer peripheral wall and increases heat transfer from the heater element to an exhaust gas flowing through the hollow space.

In yet another form, a heating apparatus for a fluid flow system having a fluid conduit is provided that comprises at least one heater element and a support member disposed within the fluid conduit and configured for restricting movement of the at least one heater element relative to the fluid conduit. The support member defines a tortuous geometry and flanks opposed sides of the at least one heater element along a majority of a length of the at least one heater element, and the support member increases heat transfer from the at least one heater element to a fluid flowing through the fluid conduit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
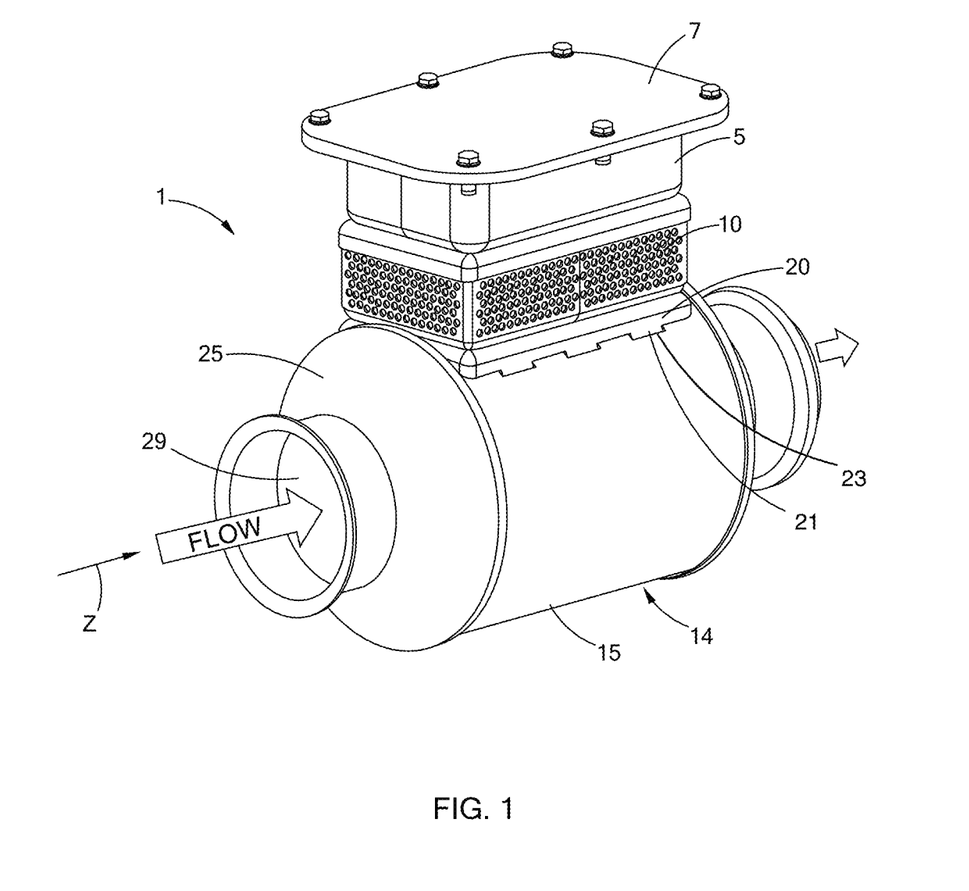
FIG. 1 is a perspective view of a heating apparatus constructed according to the teachings of the present disclosure.

Referring to FIG. 1, the heating apparatus 1 in one form generally includes a junction box 5, a perforated box assembly 10, a container body 14 including one or more separable container section components 15, and a heater flange component 20. Exhaust system coupling components 25 may be provided at opposing ends of the container body 14 to couple the heating apparatus 1 into an exhaust system (not shown). The flow of exhaust gases passes from the exhaust system into the heating apparatus 1 through an exhaust gas channel 29 formed in the heating apparatus 1. The exhaust gas channel 29 is defined jointly by the container body 14 and the heater flange component 20 and extends along an exhaust flow direction Z of the container body 14. The heater flange component 20 generally has a plate configuration in one form and may include a plurality of tabs 21 that are inserted into corresponding slots 23 in the container body 14. The modular design of the heating apparatus 1 allows the dimensions of the various components in the heating apparatus 1 to stay the same with only the length of each component being varied to accommodate the requirement(s) of the application. A junction box lid 7 may be incorporated into the heating apparatus 1.

Alternatively, the container body 14 and the heater flange component 20 may be configured to fit inside an exhaust pipe (not shown) such that the container body 14 is disposed in an exhaust gas channel defined by the exhaust pipe.

In other forms of the present disclosure, alternate heater arrangements can be provided without the junction box 5 and the perforated box assembly 10, such as those described in greater detail below. Therefore, it should be understood that the junction box 5 and the perforated box assembly 10 are merely exemplary and should not be construed as limiting the scope of the present disclosure.

Figure 2:
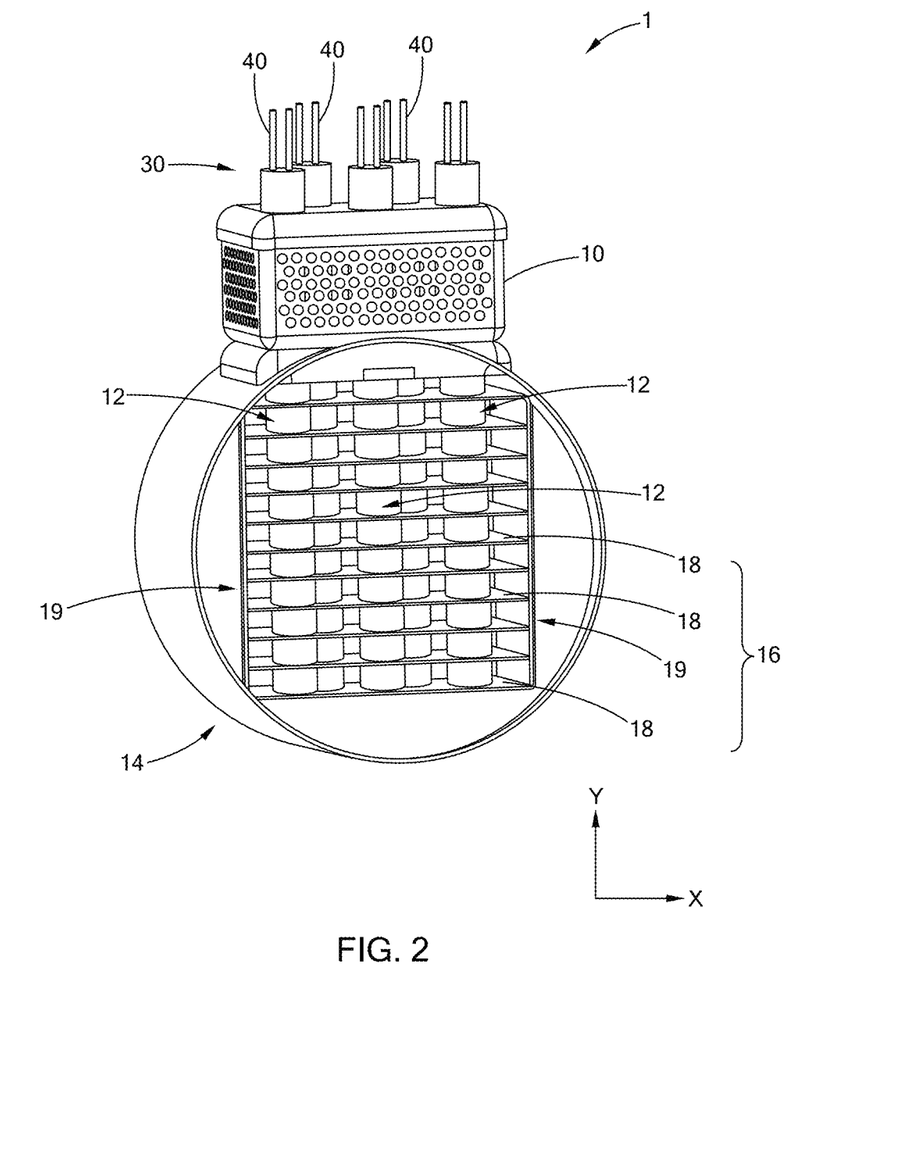
FIG. 2 is another perspective view of a heating apparatus of FIG. 1, wherein the heating apparatus is shown to be in the fluid flow channel.

Referring to FIG. 2, the heating apparatus 1 includes one or more heater elements 12 and a support member 16. The heater elements 12 may be disposed to be in a direction across the exhaust flow direction Z. For example, the heater elements 12 may be a plurality of cartridge heaters extending along a vertical direction Y, perpendicular to the exhaust flow direction Z. Alternatively, the heater elements 12 may be disposed to be at an angle relative to the exhaust flow direction Z. In FIG. 2, the junction box 5 and the junction box lid 7 are removed to show proximal ends 30 and the power pins 40 of the heater elements 12.

Figure 3:
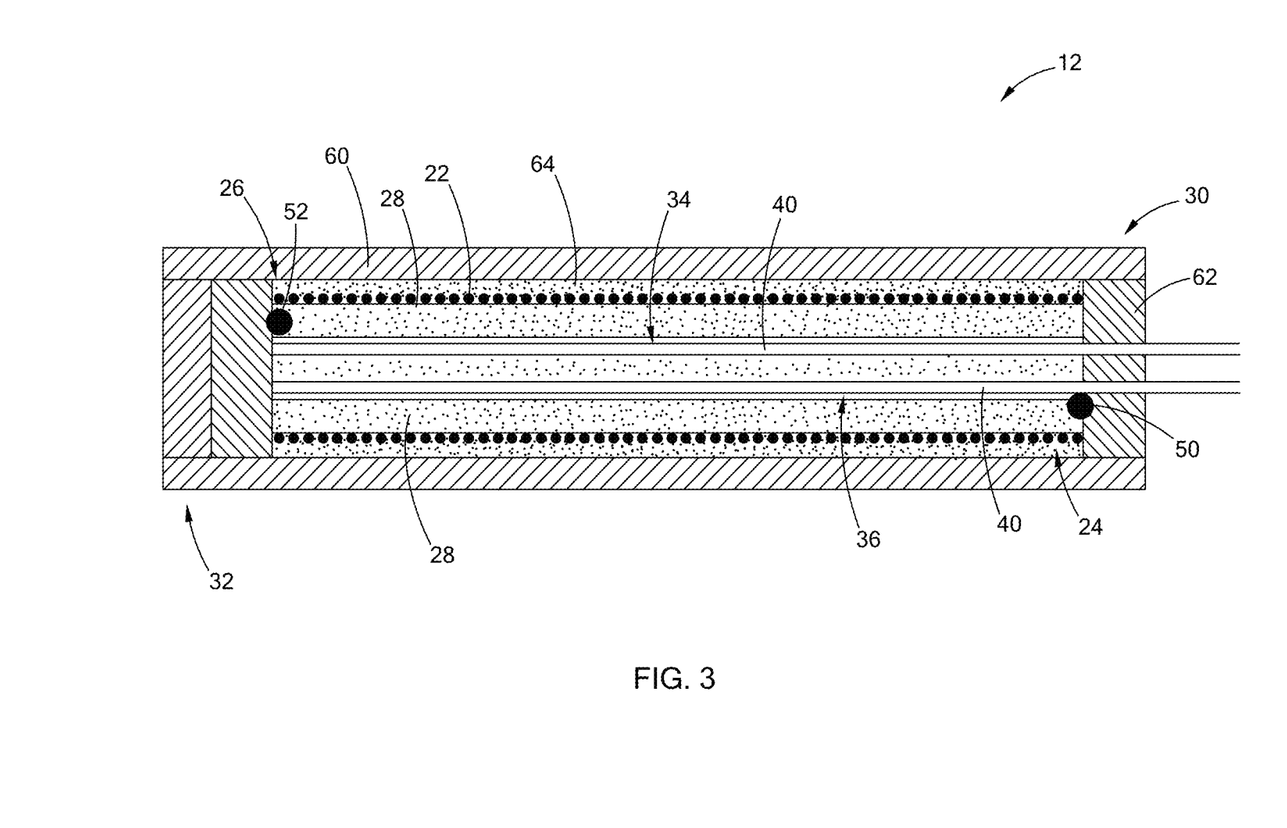
FIG. 3 is a cross-sectional view of a heater element of FIG. 2.
Figure 4:
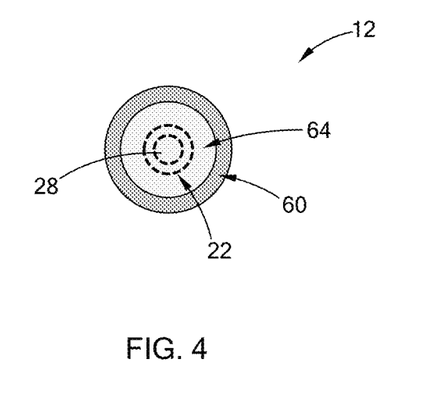
FIG. 4 is a cross-sectional view of a tubular heater element constructed in accordance with the teachings of the present disclosure.

Referring to FIGS. 3 and 4, the heater elements 12 may be cartridge heaters, each including a resistive heating element 22 in the form of a metal wire, a core 28 around which the resistive heating element 22 is wound, an outer sheath 60 surrounding the core 28, and an insulating material 64. The core 28 may be a ceramic core defining two longitudinal bores 34, 36 in which a pair of power pins 40 inserted. A first end 50 of the resistive heating element 22 is electrically connected to one of the power pins 40 and the other end 52 of the resistive heating element 22 is electrically connected to the other one of the power pins 40. The outer sheath 60 may have an open end and a closed end, or two open ends, thus creating an annular space between the outer sheath 60 and the resistive heating element 22. The insulating material 64 fills in the annular space and may be any material that can provide electrical isolation between the resistive heating element 22 and the outer sheath 60. As an example, the insulating material 64 may be magnesium oxide (MgO) or the like and is poured into the open end of the sheath 60 to fill the annular space between the resistive heating element 22 and the inner surface of the sheath 60.

The open end of the sheath 60 may be sealed, for example by using a potting compound and/or discrete sealing members 62. The entire assembly is then compacted or compressed, as by swaging or by other suitable processes, to reduce the diameter of the outer sheath 60 and to thus compact and compress the MgO and to at least partially crush the ceramic core 28 so as to collapse the core 28 about the power pins 40 to ensure good electrical contact and thermal transfer. The compacted MgO provides a relatively good heat transfer path between the resistive heating element 22 and the outer sheath 60 and it also electrically insulates the outer sheath 60 from the resistive heating element 22. The heater element 12 defines a proximal end 30 where the sealing member 62 is disposed and the power pins 40 protrudes outwardly, and a distal end 32 opposing the proximal end 30.

Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Referring back to FIG. 2, the heater elements 12 are disposed such that the distal ends 32 extend into the exhaust gas channel 29 and the proximal ends 30 and the power pins 40 extend through the perforated box assembly 10 and into the junction box 7. The support member 16 includes a plurality of support sheets 18 parallel to one another and extending along a horizontal direction X perpendicular to the exhaust flow direction Z and the vertical direction Y to support the plurality of the heater elements 12 in the container body 14. The plurality of support sheets 18 may be spaced apart along the vertical direction Y at a spacing less than 3 inches. Optionally, the support member 16 further includes at least one cross member 19 extending in a vertical direction Y for connecting the support sheets 18. The support sheets 18 and the cross member 19 may be formed as an integral, one-piece component, or may be formed separately and later connected together. Alternatively, the support member 16 may include only one support sheet 18 to support the heating elements 12 inside the exhaust gas channel 29 while distributing the heat generated by the heater elements 12 to the exhaust gas flowing in the exhaust gas channel 29. The support member 16 may provide a combination of conductive, convective and radiative heat transfer to improve heat transfer from the heater elements 12 to the surrounding exhaust gas, thereby obtaining, without increasing the temperature of the heater, a higher power density than that obtained by a heater element without the support member 16.

Power density is determined by dividing the power by the surface area. For a heater element of a type of a cartridge heater, a cable heater or a tubular heater, the surface area may be the sheath surface area or the resistive wire surface area. The maximum power density of the heater to avoid overheating is also affected by velocity of the exhaust gas, which, in turn, is affected by the engine speeds and the engine loads. When the velocity of the exhaust gas is higher, more heat from the heater element may be carried away by the exhaust gas per unit of time. Therefore, the heater element may generate a higher power density when the velocity of the exhaust gas is relatively high without overheating or damaging the heater element. While it is desirable to provide a heater element with increased power density to reduced size and weight of the heater element, the power density of the heater element may be limited when an engine is running at a lower engine speed and at lower engine load. When the velocity of the exhaust gas flow is relatively low due to lower engine speed and lower engine load, less heat is carried away by the exhaust gas per unit of time. The heater element heats up faster, and thus a lower watt density is used in order to avoid over-heating. The durability of a heater element of a cartridge type, a cable type, or a tubular type depends, in part, on the temperature of the resistive heating element and the outer sheath. Therefore, the heater element should be configured based on the engine speed and the engine torque in order to properly heat the exhaust gas without compromising durability of the heater element.

For example, for a 7-liter engine running in a low idle condition, the mass flow could be about 0.04 kg/s, and the exhaust temperature approximately 150° C. A typical single element heater in these exhaust conditions may allow a maximum power density of approximately 50 watts/in$^2$ for the sheath and approximately 120 watts/in$^2$ for the resistive heating wire in order to avoid damage to the heater.

In contrast, under the similar engine operating conditions, the heating apparatus including the heater element and the support member according to the present disclosure may allow a maximum power density of approximately 84 watts/in$^2$ for the sheath and approximately 230 watts/in$^2$ for the resistance wire and result in the same heater temperature and durability. Therefore, the heating apparatus of the present disclosure enable higher power density than that of a typical heater element.

Therefore, the support member of the heating apparatus of the present disclosure not only stiffens or restricts the movement of the insulated heater element, but also improves heat transfer from the heater element to the surrounding exhaust gas. Therefore, the power density of the heating apparatus can be increased without increasing the target heating temperature of the heater element.

Alternatively, the heater elements 12 may be securely disposed inside the exhaust gas channel 29, for example, by perforated box assembly 10 and/or other mounting structure provided at the proximal ends 32 of the heater elements 12. In this case, restricting movement of the heater element 12 by a support member may not be necessary. Therefore, the heating apparatus 1 may include one or more fins attached to the heater element 12 for the sole purpose of providing conductive, convective and radiative heat transfer to improve heat transfer from the heater element 12 to the surrounding exhaust gas. The fins may be configured to be structurally similar to the support sheets 18 as shown in FIG. 2, but are not used to support the heater elements 12.

Figure 5:
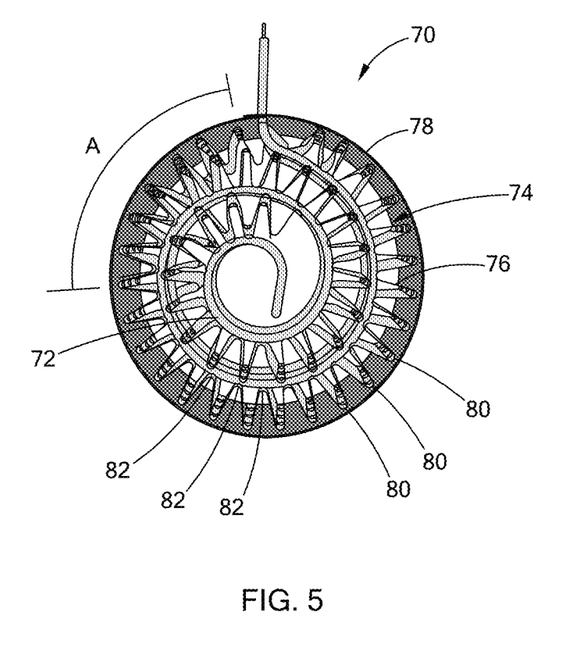
FIG. 5 is a schematic perspective view of another heating apparatus constructed in accordance with the teachings of the present disclosure.

Referring to FIG. 5, another form of a heating apparatus 70 may include a heater element 72 and a support member 74. The heater element 72 may be a cable heater and bent into a tortuous shape such as those selected from a group consisting of a spiral shape, a sinuated shape, a coil shape, a zig-zag shape or any of the combinations thereof. The support member 74 may include a corrugated strip 74 and a peripheral wall 76 surrounding the corrugated strip 74. In the illustrative example of FIG. 5, the corrugated strip 74 is bent into a spiral shape conforming to the spiral shape of the heater element 72 such that heater element 72 may be sandwiched between portions of the corrugated strip 74. In other words, the heater element 72 includes a plurality of sections arranged along a radial direction of the peripheral wall 76 which has a tubular shape and which defines a hollow space. The corrugated strip 74 incudes a plurality of sections disposed between adjacent two of the sections of the heater element 72 and between an outermost section of the heater element 72 and the peripheral wall 76. Optionally, the corrugated strip 74 may be wrapped back to have some overlap portions A. Shapes other than the spiral shape may also be employed, such as by way of example, sinuated bends (not shown) while remaining within the scope of the present disclosure.

The corrugated strip 74 includes alternate ridges 80 and grooves 82. The corrugated strip 74 may be brazed or welded to the heater element 72 at a plurality of contact points to increase stiffness of the heater element 72. The plurality of contact points are spaced at a spacing along a length of the corrugated strip 74. The spacing is less than ten times an outerside diameter of the heater element 72. The natural frequency of vibration for the sections of the heater element between adjacent two contact points may be greater than 400 Hz. When the corrugated strip 74 and the heater element 72 have fewer contact points, the heat transfer characteristics may be restricted, but it is relatively easier to secure the heater element 72 to the corrugated strip 74. In contrast, when the corrugated strip 74 and the heater 72 have more contact points, the heater transfer characteristics are optimized but it is relatively difficult to secure the heater element 72 to the corrugated strip 74. The number of the contact points is selected such that a temperature variation across the heating apparatus is less than 200° C.

Alternately, the heater element 72 may be disposed loosely between portions of the corrugated strip 74, or not even contact the heater element 72. In either case, the corrugated strip 74 acts as both a stiffener and a vibration dampener. The outer wall 72 may be a part of the container body 14 or a separate component from the container body 14 and completely disposed in the exhaust gas channel.

Like the support sheets 18 in FIG. 2, the corrugated strip 74 provides a combination of conductive, convective and radiative heat transfer that improves heater transfer from the heater element 72 to the surrounding exhaust gas, thereby achieving a higher power density without increasing the temperature of the heater element than that provided by a typical heater element.

Figure 6:
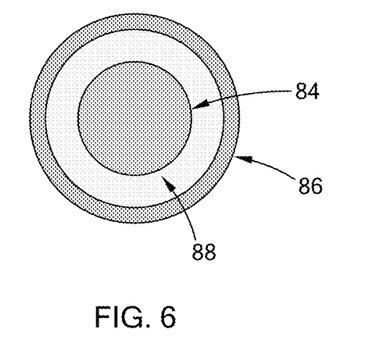
FIG. 6 is a schematic cross-sectional view of a heater element of the heating apparatus of FIG. 5.

Referring to FIG. 6, the heater element 72 may be a cable heater including a resistive heating element 84, an outer sheath 86, and an insulating material 88 filling in a space between the resistive heating element 84 and the outer sheath 86. It is understood that the heater element 72 may be a cartridge heater, a tubular heater, or any heater that can be bent into a desired shape.

Figure 7:
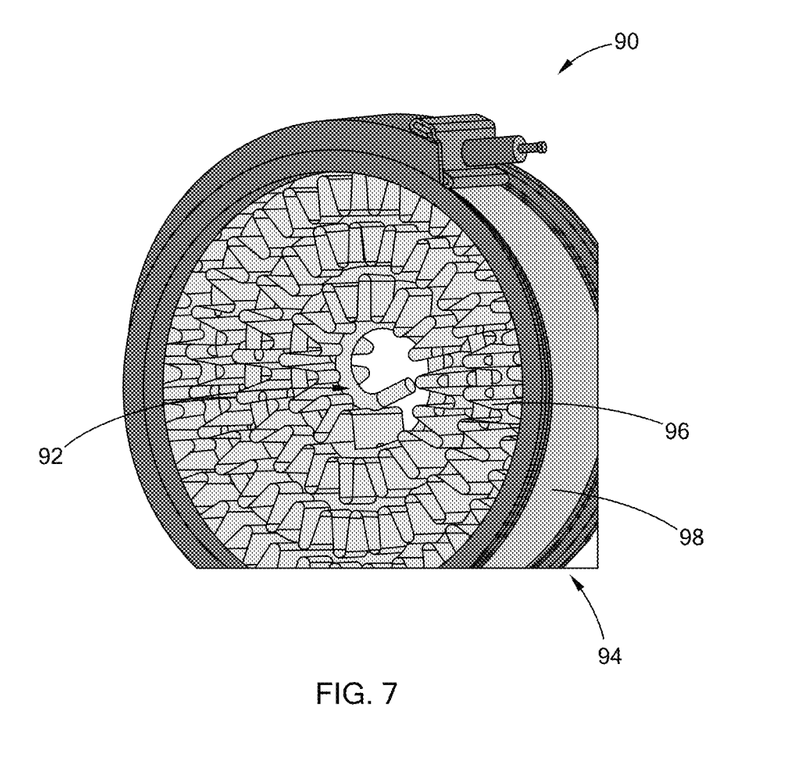
FIG. 7 is a perspective view of still another heating apparatus constructed in accordance with the teachings of the present disclosure.

Referring to FIG. 7, another form of a heating apparatus 90 is shown to include a heater element 92 and a support member 94. The support member 94 includes a corrugated sheet 96 wrapped into a spiral shape, and an outer peripheral wall 98 surrounding the corrugated sheet 96. The corrugated sheet 96 may be bent into a spiral shape conforming to the spiral shape of the heater element 92 so that the heater element 92 is sandwiched between portions of the corrugated sheet 94. In this form, the use of a junction box and perforated box assembly is eliminated and thus a simpler and lower cost assembly is provided.

Figure 8:
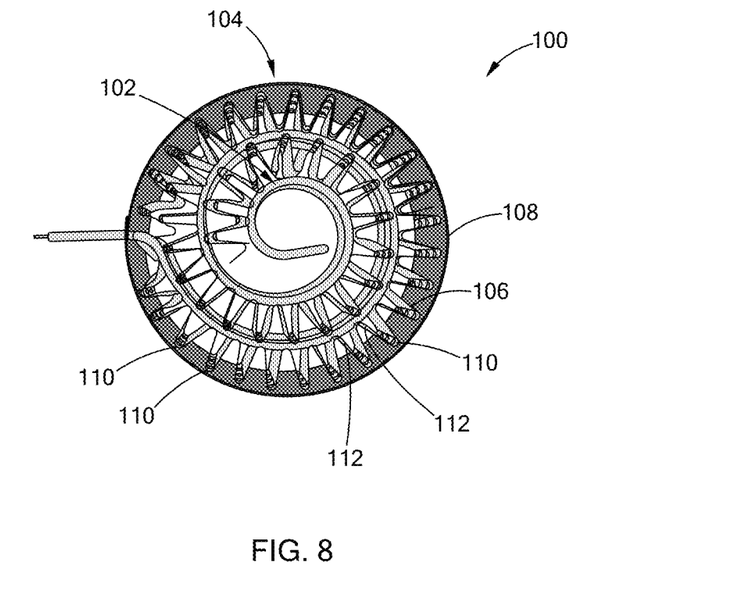
FIG. 8 is a perspective view of still another heating apparatus constructed in accordance with the teachings of the present disclosure.

Referring to FIG. 8, another form of the heating apparatus is similar to that of FIG. 5 except for the structure of the support member. More specifically, the heating apparatus 100 includes a heater element 102 and a support member 104, which may be welded or brazed for joining. The support member 104 includes a corrugated strip 106 and an outer peripheral wall 108. Similar to the corrugated strip 74 of FIG. 5, the corrugated strip 106 is bent into a spiral shape conforming to the spiral shape of the heater element 102 and includes a plurality of ridges 110 and grooves 112. The outermost portion of the corrugated strip 106 is welded to an inner surface of the outer peripheral wall 108 at the ridges 110. The outer peripheral wall 108 may be a part of the container body 14 and defines the exhaust gas channel 29 or may be component separate from the container body 14. The outer peripheral wall 108 may be loosely disposed inside the container body 14 or fixed to the container body 14.

Figure 9:
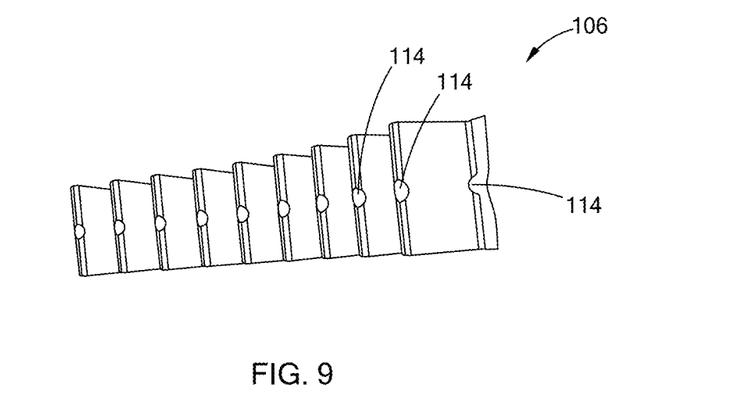
FIG. 9 is a perspective view of a corrugated strip of the heating apparatus of FIG. 8, wherein the corrugated strip is shown in its original, unbent state.

Referring to FIG. 9, the corrugated strip 106 is shown to be in an original, unbent state. The corrugated strip 106 further defines a plurality of openings that facilitate engagement between the heater element 102 and the corrugated strip 106. In the example provided, these openings are in the form of indentations 114 at the ridges 110 and grooves 112 to facilitate engagement between the heater element 102 and the corrugated strip 106. Portions of the heater element 102 corresponding to the indentations 114 may be inserted into the indentations 114 to improve engagement between the heater element 102 and the corrugated strip 106. Although one row of indentations 114 is illustrated, it should be understood that multiple rows of indentations may be employed while remaining within the scope of the present disclosure.

Figure 10:
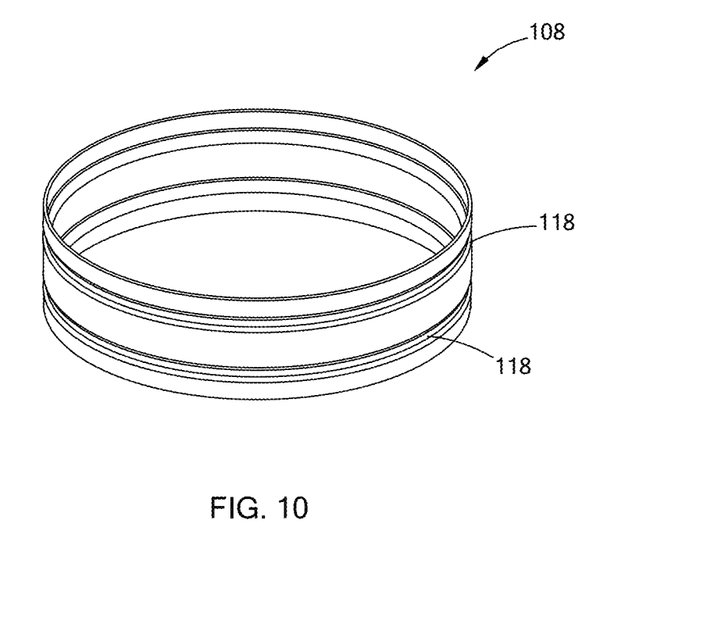
FIG. 10 is a perspective view of an outer peripheral wall of the heating apparatus of FIG. 8.
Figure 11:
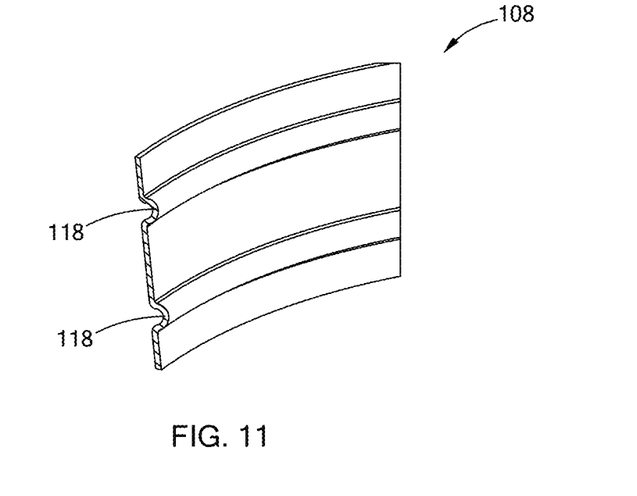
FIG. 11 is a perspective cross-sectional view of a section of the outer peripheral wall of FIG. 10.

Referring to FIGS. 10 and 11, the outer peripheral wall 108 may define a mounting feature for mounting the corrugated strip 106 onto the outer peripheral wall 108. For example, the mounting feature may be a plurality of annular grooves 118 formed on an inner surface of the outer peripheral wall 108 to facilitate engagement between the corrugated strip 106 and the outer peripheral wall 108. It is understood that the mounting feature is not limited to the annular grooves 118 shown in FIGS. 10 and 11, and may be any structure that can engage and secure the corrugated strip 106 to the outer peripheral wall 108.

Figure 12:
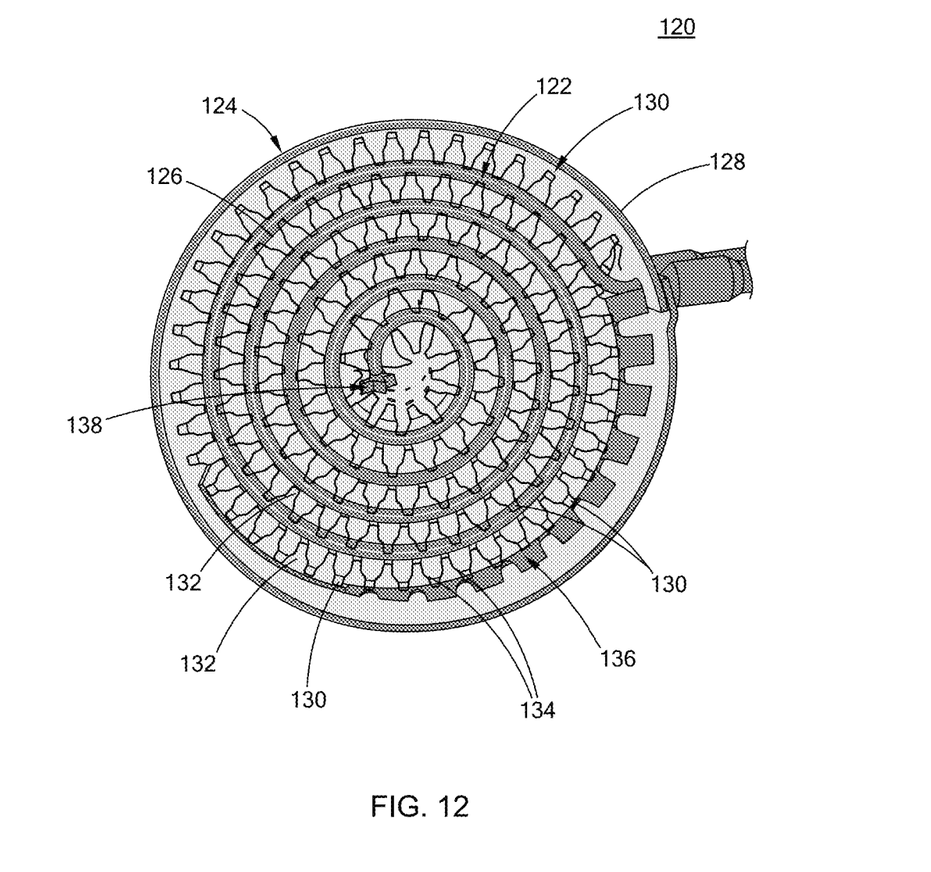
FIG. 12 is a perspective view of still another form of a heating apparatus constructed in accordance with the teachings of the present disclosure.

Referring to FIG. 12, another form of a heating apparatus 120 constructed in accordance with the teachings of the present disclosure is structurally similar to that of FIG. 5 except that the heating apparatus 120 has a smaller size to fit in any part of the after-treatment container or component to heat the exhaust gas, while generating the same amount or close to the amount of heat generated by a larger size of the heating apparatus.

More specifically, the heating apparatus 120 includes a heater element 122, and a support member 124. The support member 124, which may be a single component or an assembly of pieces, includes a corrugated strip 126, and a peripheral wall 128 surrounding the corrugated strip 126. The support member 124 defines a tortuous geometry and in one form flanks opposed sides of the heater element 122 along a majority of a length of the heater element 122 as shown. As used herein, the term "tortuous" should be construed to mean a shape that changes direction a plurality of times, in a regular or irregular manner, in order to increase heat transfer from the heater element 122 to the fluid flow, e.g. exhaust flow.

The heater element 122 may be formed into a tortuous shape selected from a group consisting of a spiral shape, a sinuated shape, a coil shape, a zig-zag shape or any of the combinations thereof. To increase the total amount of heat generated by the small-size heating apparatus 120, the heater element 122 is formed into more turns and is more compact. The corrugated strip 126 can be formed into more turns and includes alternate ridges 130 and grooves 132 to form a tortuous geometry. The corrugated strip 126 may be brazed, welded, or secured by any means to the heater element 122 at the alternate ridges 130 and grooves 132. Due to the reduced space defined between adjacent sections of the heater element 122, the corrugated strip 126 may be configured to form a wavy surface 134 between adjacent ridges 130 and grooves 132, and/or the ridges 130 and the grooves 132 may be configured to have a wider contact area with the adjacent sections of the heater element 122. As a result, the total surface area of the corrugated strip 126 may be further increased to increase the heat transfer from the heater element 122 to the surrounding exhaust gas.

Optionally, the heating apparatus 120 may further include one or more spacers 136 and an end piece 138. The spacer 136 may be used to fill any gap that may be present between the peripheral wall 128 and the outermost section of the corrugated strip 126 to more tightly secure the corrugated strip 126 inside the peripheral wall 128. The end piece 138 is disposed at an end of the heater element 122 so that the end of the corrugated strip 126 disposed proximate the center of the outer may be secured to the end piece 138.

According to the present disclosure, the heating apparatus has the advantages of providing more power in a smaller area, thereby reducing the size and weight of the heating apparatus without compromising heater durability. The heating apparatus can provide a relatively faster heat-up during engine cold start and during transient conditions.

Additionally, the supports as described herein may be arranged in order to block what is known as a "view factor," or a line of sight between parts that could radiate heat to each other. The supports may be arranged to block a direct line of sight between heating elements or portions of the same heating element to create a line of sight to a cooler support. Such arrangements should be construed as falling within the scope of the present disclosure.

While the heating apparatus has been described to include cartridge heater, a tubular heater or a cable heater, it should be understood that the teachings of the present disclosure may be applied to other types of heaters without departing from the scope of the present disclosure.

It should be noted that the disclosure is not limited to the embodiment described and illustrated as examples. A large variety of modifications have been described and more are part of the knowledge of the person skilled in the art. For example, the application of exhaust heating is merely exemplary and thus any heating application with a fluid flow in a fluid conduit should be construed as being within the scope of the present disclosure. These and further modifications as well as any replacement by technical equivalents may be added to the description and figures, without leaving the scope of the protection of the disclosure and of the present patent.

What is claimed is:

1. A heating apparatus for a fluid flow system having a container body, the heating apparatus comprising:

a heater element within the container body, the heater element including an electrical resistance element, a sheath, and an insulating material, the sheath extending along a predefined path through the container body and surrounding the electrical resistance element along the predefined path, the insulating material disposed about the electrical resistance element between the electrical resistance element and the sheath, wherein the insulating material electrically insulates the electrical resistance element from the sheath; and a strip disposed inside the container body and defining a tortuous geometry that follows the predefined path, wherein the strip defines a plurality of openings at discrete locations along the strip, wherein the heater element extends through the plurality of openings and is configured to contact the strip at the discrete locations and not contact the strip between the discrete locations.

2. The heating apparatus according to claim 1, wherein the predefined path is a tortuous shape.

3. The heating apparatus according to claim 1, wherein the predefined path is selected from a group consisting of a spiral shape, a sinuated shape, a coil shape, a zig-zag shape, and combinations thereof.

4. The heating apparatus according to claim 1, wherein the predefined path is a spiral shape.

5. The heating apparatus according to claim 1, wherein a first section of the strip is positioned to support a second section of the strip, the second section being radially inward of the first section and further along the predefined path than the first section.

6. The heating apparatus according to claim 1, wherein the heater element is sandwiched between portions of the strip that are located at different locations along the predefined path.

7. The heating apparatus according to claim 1, wherein the strip is a corrugated strip defining a plurality of ridges and grooves.

8. The heating apparatus according to claim 7, wherein the openings are disposed at the ridges and grooves.

9. The heating apparatus according to claim 1 further comprising an outer peripheral wall surrounding the strip, wherein the outer peripheral wall defines an annular groove and the strip is configured to engage the outer peripheral wall via the annular groove.

10. The heating apparatus according to claim 1 further comprising an outer peripheral wall surrounding the strip, wherein the container body defines an outer boundary of a gas flow channel and the outer peripheral wall is a separate component from the container body and is disposed inside the container body.

11. The heating apparatus according to claim 1, wherein the heater element is disposed loosely within the openings.

12. The heating apparatus according to claim 1, wherein the strip is fixed to the heater element at the plurality of discrete locations, the plurality of discrete locations being spaced at a spacing along a length of the strip, wherein the spacing is less than ten times an outside diameter of the heater element.

13. The heating apparatus according to claim 12, wherein a natural frequency of vibration for sections of the heater element between adjacent two locations of the plurality of discrete locations is greater than 400 Hz.

14. The heating apparatus according to claim 1, wherein a radially outermost portion of the strip contacts, at ridges of the tortuous geometry, an inner surface of the container body or an inner peripheral wall disposed within the container body.

15. A heating apparatus for a fluid flow system having a fluid conduit, the heating apparatus comprising:

a heater element within the fluid conduit, the at least one heater element including an electrical resistance element, a sheath, and an insulating material, the sheath extending along a tortuous path through the fluid conduit and surrounds the electrical resistance element along the tortuous path, the insulating material disposed about the electrical resistance element between the electrical resistance element and the sheath, wherein the insulating material electrically insulates the electrical resistance element from the sheath; and at least one corrugated strip disposed within the fluid conduit and configured for restricting movement of the at least one heater element relative to the fluid conduit, the at least one corrugated strip following the tortuous path along a majority of a length of the sheath, wherein the at least one corrugated strip defines a plurality of openings at discrete locations along the at least one corrugated strip, wherein the heater element extends through the plurality of openings and the sheath is configured to contact the at least one corrugated strip at the discrete locations and not contact the strip between the discrete locations.

16. The heating apparatus according to claim 15, wherein the tortuous shape is selected from a group consisting of a spiral shape, a sinuated shape, a coil shape, a zig-zag shape, and combinations thereof.

17. The heating apparatus according to claim 15, wherein the at least one corrugated strip includes a plurality of ridges and grooves and defines a plurality of indentions disposed at ridges and grooves, the sheath being received in the indentions.

18. The heating apparatus according to claim 15, wherein the at least one corrugated strip surrounds opposite sides of the heating element along the majority of the length of the sheath.

19. The heating apparatus according to claim 15, wherein a first section of the at least one corrugated strip is positioned to support a second section of the at least one corrugated strip, the second section being radially inward of the first section.

20. A heating apparatus for a fluid flow system having a fluid conduit, the heating apparatus comprising:

a heater element extending along a spiral path within the fluid conduit, the heater element including an electrical resistance element, a sheath, and an insulating material disposed about the electrical resistance element, wherein the insulating material electrically insulates the electrical resistance element from the sheath; and a continuous corrugated strip disposed within the fluid conduit, the continuous corrugated strip following the spiral path and configured to contact the sheath at discrete locations along the spiral path such that one side of a region of the sheath is configured to contact a first location on the corrugated strip and an opposite side of the region of the sheath is configured to be contacted by a second location on the corrugated strip, the second location being further along the spiral path than the first location.

* * * * *